United States Patent [19]
Yarnell et al.

[11] Patent Number: 5,579,661
[45] Date of Patent: Dec. 3, 1996

[54] NOISE AND VIBRATION DAMPENING CONNECTOR FOR A TWO-PIECE TRANSMISSION SHIFT LEVER ASSEMBLY

[75] Inventors: James A. Yarnell, Temperance, Mich.; Larry D. Stawinski, Toledo, Ohio

[73] Assignee: Dana Corporation, Toledo, Ohio

[21] Appl. No.: 300,642

[22] Filed: Sep. 2, 1994

[51] Int. Cl.$^6$ .............................. F16H 59/02; G05G 1/04
[52] U.S. Cl. ................... 74/473 R; 29/451; 29/525; 29/525.11; 29/525.12; 74/523; 403/281; 403/305; 403/362; 403/378
[58] Field of Search ................. 74/473 R, 523, 74/524, 543, 544, 548; 403/300, 305, 362, 378, 376; 29/525, 525.11, 525.12, 451

[56] References Cited

U.S. PATENT DOCUMENTS

| | | | |
|---|---|---|---|
| 1,927,646 | 9/1933 | Miller . | |
| 2,041,704 | 5/1936 | Gordon et al. . | |
| 2,315,792 | 4/1943 | Hoss | 403/305 |
| 3,476,349 | 11/1969 | Smith | 403/362 |
| 3,515,027 | 6/1970 | Textrom | 403/300 |
| 3,693,467 | 9/1972 | Oehl | 74/473 R |
| 4,492,129 | 1/1985 | Hasegawa | 74/473 R |
| 4,569,246 | 2/1986 | Katayama et al. | 74/473 R |
| 4,603,598 | 8/1986 | Tsuji et al. | 74/473 P |
| 4,768,393 | 9/1988 | Beaman | 74/473 R |
| 4,895,469 | 1/1990 | Coneron | 403/362 |
| 4,960,009 | 10/1990 | Schultz et al. | 74/473 R |
| 5,189,925 | 3/1993 | Neal et al. | 74/473 R |
| 5,347,881 | 9/1994 | Watson et al. | 74/473 R |
| 5,413,008 | 5/1995 | Brock | 74/18 |

OTHER PUBLICATIONS

Eaton Fuller Transmissions—S–1607 Isolator Assembly Brochure (Oct. 2, 1992).

Rockwell Controls–Isolator Assembly–Straight Lever (undated).

Dana Drawing 25Q–2656–1X (Jul. 1, 1993).

Primary Examiner—Allan D. Herrmann
Attorney, Agent, or Firm—MacMillan, Sobanski & Todd

[57] ABSTRACT

A noise and vibration dampening connector for a two-piece transmission shift lever assembly includes a lower shift lever member and an upper shift lever member which are connected together by the dampening connector. The upper end of the lower shift lever member is cylindrical in shape, having a flat formed thereon. The lower end of the upper shift lever member has a cylindrical knurled surface. The dampening connector includes a hollow cylindrical sleeve having an axial bore formed therethrough. The axial bore is stepped so as to form an internal shoulder which divides the sleeve into an upper portion and a lower portion. The upper portion of the sleeve has a relatively large internal diameter and a relatively thin wall thickness, while the lower portion of the sleeve has a relatively small internal diameter and a relatively thick wall thickness. A welch plug is seated on the internal shoulder, and a cup-shaped rubber isolator is seated on the welch plug. The lower end of the upper shift lever member extends into the rubber isolator and is secured to the sleeve by crimping the wall of the upper portion thereagainst. A threaded aperture is formed through the wall of the lower portion of the sleeve, and a set screw is partially threaded therein. The upper end of the lower shift lever member extends within lower portion of the sleeve such that the flat formed thereon is aligned with the partially threaded set screw. Then, the set screw is further threaded within the wall of the lower portion of the sleeve so as to extend into a recess formed in the flat to secure the upper end of the lower shift lever member to the sleeve.

19 Claims, 2 Drawing Sheets

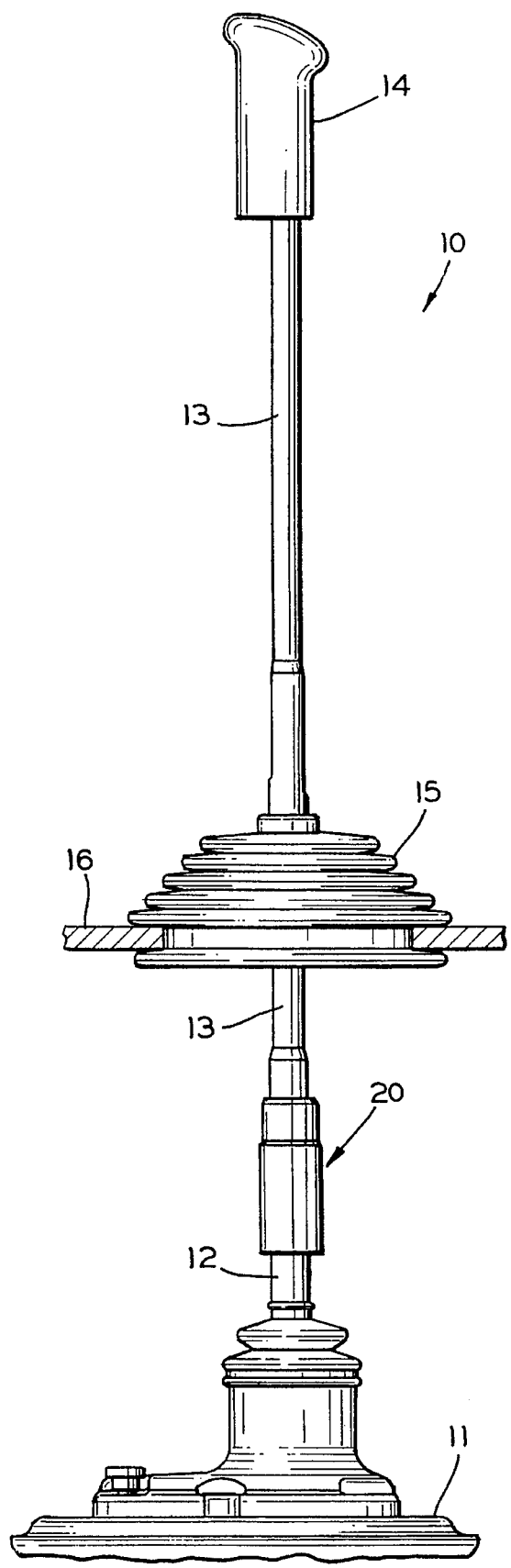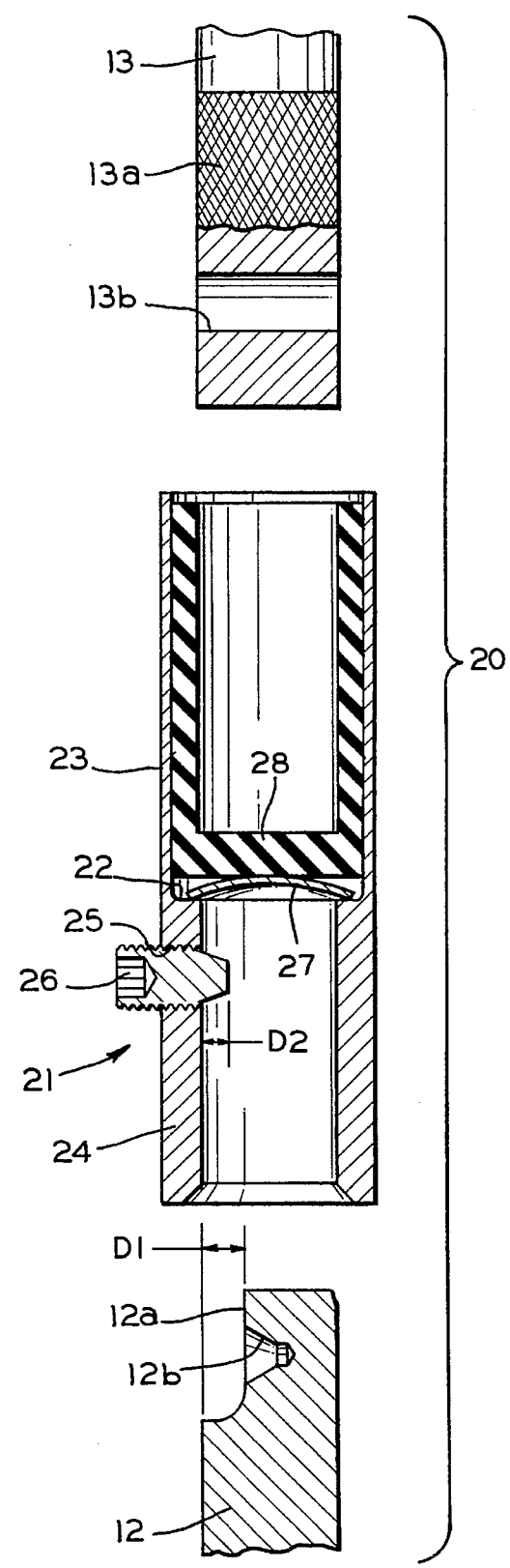
FIG. 1
FIG. 2

NOISE AND VIBRATION DAMPENING CONNECTOR FOR A TWO-PIECE TRANSMISSION SHIFT LEVER ASSEMBLY

BACKGROUND OF THE INVENTION

This invention relates in general to shift levers for manually operable vehicle transmissions and in particular to a noise and vibration dampening connector for a two-piece transmission shift lever assembly.

In most vehicles, a transmission is provided in the drive train between the engine and the driven wheels. As is well known, the transmission includes a plurality of gears which are selectively engaged to provide a plurality of speed reduction gear ratios between the input and the output of the transmission. A control member within the transmission is moved by a driver of the vehicle throughout a plurality of gear ratio positions for selecting the desired speed reduction. As a result, acceleration and deceleration of the vehicle can be achieved in a smooth and efficient manner.

In many smaller vehicles, such as automobiles, the transmission functions automatically to move the control member without any physical intervention by the driver of the vehicle. However, such automatic transmissions are typically not used in larger vehicles, such as trucks, because of their increased size and expense. Such larger vehicles are, therefore, often provided with manually operable transmissions. In a manually operable transmission, the shifting of the control member is accomplished by physical movement of the control member by the vehicle driver.

In order to move the control member among the various gear ratio positions in a manual transmission, a manually operable shift lever assembly is usually provided. The shift lever assembly includes a lower member, which extends downwardly within the transmission into engagement with the control member. The shift lever assembly further includes an upper member, which extends upwardly into a driver compartment of the vehicle for convenient grasping and manipulating by the vehicle driver. Thus, when the upper member of the shift lever assembly is moved by the vehicle driver, the lower member thereof is moved within the transmission. By properly moving the upper member of the shift lever assembly, the vehicle driver can position the control member of the transmission so as to select any one of the plurality of gear ratios for use.

When the vehicle is operated, it has been found that the transmission and other components of the drive train of the vehicle vibrate to a certain extent. In addition, vibrations are generated by the vehicle engine itself during operation. All of such vibrations can be sensed by the vehicle driver as undesirable noise. To reduce the amount of this undesirable noise, the driver compartment of the vehicle is typically lined with acoustical insulating material. Unfortunately, the upper member of the shift lever assembly must extend upwardly from the transmission into the driver compartment for convenient use, as described above. As a result, the shift lever assembly can function to transmit these vibrations into the driver compartment, thus defeating the acoustical insulation.

To address this, it is known to provide a dampening mechanism in the shift lever assembly for reducing the amount of vibration and noise transmitted therethrough from the engine and transmission to the driver compartment of the vehicle. To accomplish this, the shift lever assembly is divided into upper and lower shift lever members, and a noise and vibration dampening connector is connected therebetween. A typical vibration and noise dampening connector includes one or more elastic dampening members which are disposed within a cylindrical sleeve connected between the upper and lower shift lever members. A number of such vibration and noise dampening connectors are known in the art. However, known vibration and noise dampening connectors have been found to be unduly complex and expensive in construction and assembly. Consequently, it would be desirable to provide an improved structure for a noise and vibration dampening connector for a multi-piece transmission shift lever assembly which is simple and inexpensive in construction and assembly.

SUMMARY OF THE INVENTION

This invention relates to an improved structure for a noise and vibration dampening connector for a two-piece transmission shift lever assembly. The shift lever assembly includes a lower shift lever member and an upper shift lever member which are connected together by the dampening connector. The upper end of the lower shift lever member is cylindrical in shape, having a flat formed thereon. The lower end of the upper shift lever member has a cylindrical knurled surface. The dampening connector includes a hollow cylindrical sleeve having an axial bore formed therethrough. The axial bore is stepped so as to form an internal shoulder which divides the sleeve into an upper portion and a lower portion. The upper portion of the sleeve has a relatively large internal diameter and a relatively thin wall thickness, while the lower portion of the sleeve has a relatively small internal diameter and a relatively thick wall thickness. A welch plug is seated on the internal shoulder, and a cup-shaped rubber isolator is seated on the welch plug. The lower end of the upper shift lever member extends into the rubber isolator and is secured to the sleeve by crimping the wall of the upper portion thereagainst. A threaded aperture is formed through the wall of the lower portion of the sleeve, and a set screw is partially threaded therein. The upper end of the lower shift lever member extends within lower portion of the sleeve such that the flat formed thereon is aligned with the partially threaded set screw. Then, the set screw is further threaded within the wall of the lower portion of the sleeve so as to extend into a recess formed in the flat to secure the upper end of the lower shift lever member to the sleeve.

Various objects and advantages of this invention will become apparent to those skilled in the art from the following detailed description of the preferred embodiments, when read in light of the accompanying drawings.

BRIEF DESCRIPTION OF THE DRAWINGS

FIG. 1 is an elevational view of a transmission shift lever assembly including a noise and vibration dampening connector in accordance with this invention.

FIG. 2 is an enlarged sectional elevational view of the transmission shift lever assembly illustrated in FIG. 1 shown prior to assembly.

DETAILED DESCRIPTION OF THE PREFERRED EMBODIMENT

Figure 3:
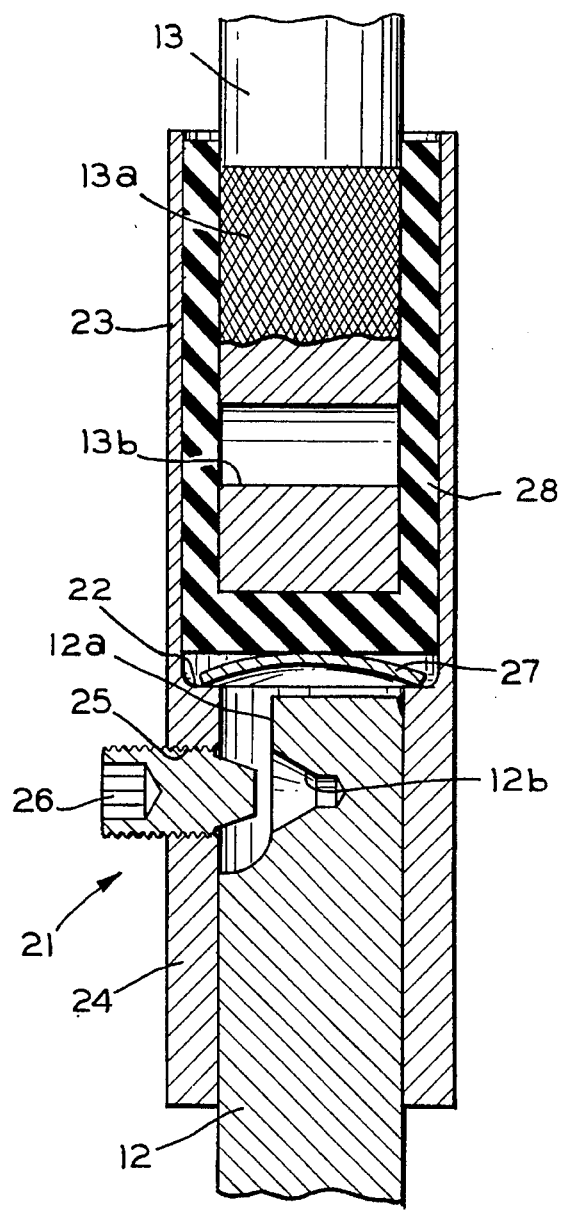
FIG. 3 is an enlarged sectional elevational view of the transmission shift lever assembly illustrated in FIG. 2 shown partially assembled.

Referring now to the drawings, there is illustrated in FIG. 1 a shift lever assembly, indicated generally at 10, in accordance with this invention. The shift lever assembly 10 is connected for use with a conventional manually operable vehicle transmission, a portion of which is shown at 11. As is well known in the art, the vehicle transmission 11 includes a plurality of gears (not shown) which are selectively engaged to provide a plurality of speed reduction gear ratios between the input and the output of the transmission 11. A control member (not shown) within the transmission 11 is moved by a driver of the vehicle throughout a plurality of gear ratio positions for selecting the desired speed reductions. The shift lever assembly 10 includes a lower shift lever member 12 which extends within the transmission 11 for selective engagement with the control member. As is well known in the art, appropriate movement of the lower shift lever member 12 causes corresponding movement of the control member. As a result, the transmission 11 can be operated to provide a desired gear ratio between the input and the output thereof.

The shift lever assembly 10 also includes an upper shift lever member 13 having a handle 14 mounted on the upper end thereof. Although not illustrated, the upper end of the upper shift lever member 13 may be angled relative to the lower end thereof so as to position the handle 14 in a convenient position for the driver of the vehicle to grasp and manipulate. The upper shift lever member 13 extends downwardly from the handle 14 through a flexible elastomeric boot 15 mounted in a relatively large diameter hole formed through a floor of the vehicle 16. The floor 16 functions as a divider between the driver compartment of the vehicle and the engine and drive train compartment. If desired, appropriate acoustical insulating material (not shown) may be incorporated into the floor 16 to reduce the amount of undesirable noise transmitted to the driver compartment.

Beneath the floor 16, the lower end of the upper shift lever member 13 extends further downwardly into engagement with a noise and vibration dampening connector, indicated generally at 20. Similarly, the upper end of the lower shift lever member 12 extends upwardly into engagement with the connector 20. As shown in the drawings, the lower end of the upper shift lever member 13 is secured to the upper end of the connector 20, while the upper end of the lower shift lever member 12 is received within the lower end of the dampening connector 20. The structure and operation of the dampening connector 20 is explained in detail below.

Figure 4:
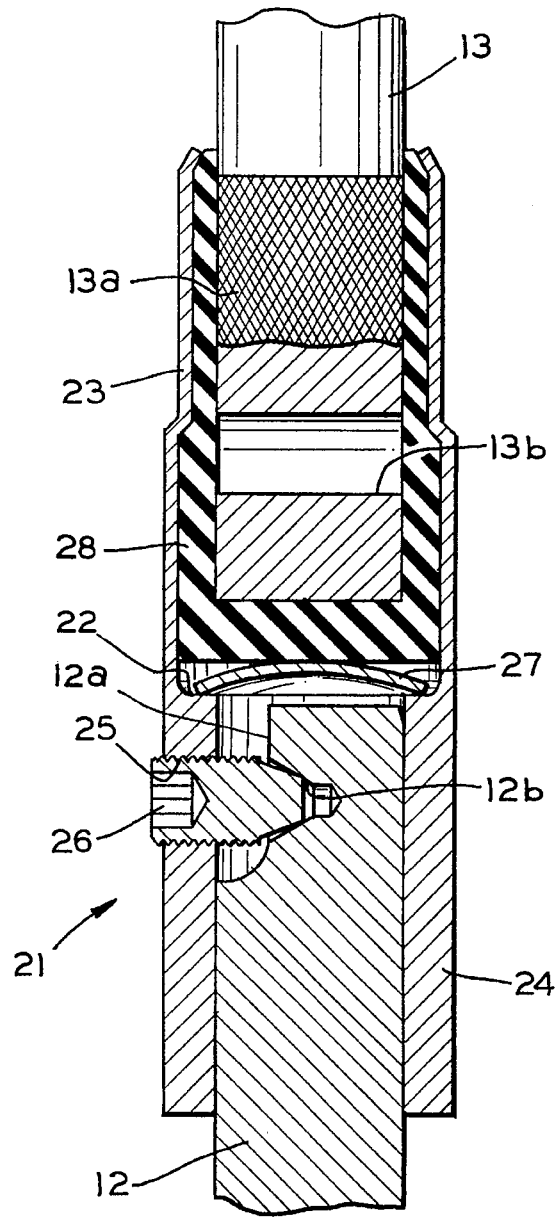
FIG. 4 is an enlarged sectional elevational view of the transmission shift lever assembly illustrated in FIG. 3 shown fully assembled.

Referring now to FIGS. 2, 3, and 4, it can be seen that the lower shift lever member 12 terminates in an upper end which is generally cylindrical in shape. However, a flat 12*a* is formed on the upper end of the lower shift lever member 12. Preferably, the flat 12*a* is planar and extends in a chord-like manner across a portion of the upper end of the lower shift lever member 12. As shown in FIG. 2, the flat 12*a* defines a first dimension D1 which extends along a radius from the center of the flat 12*a* to the projected circumference of the cylinder defined by the upper end of the lower shift lever member 12. A recess 12*b* is formed in the flat 12*a* for a purpose which will be explained below.

It can further be seen that the upper shift lever member 13 terminates in a lower end which is also generally cylindrical in shape. A portion of the outer surface of such lower end is knurled, as shown at 13*a*. The purpose for the knurled surface 13*a* will also be explained below. Also, an aperture 13*b* is formed about the lower end of the upper shift lever member 13, between the knurled surface 13*a* and the tip thereof. As mentioned above, the upper end of the upper shift lever member 13 may be angled relative to the lower end so as to position the handle 14 more conveniently for use by the driver of the vehicle. The aperture 13*b* formed through the lower end of the upper shift lever member 13 can be used to facilitate the formation of the angle at a desired location.

The dampening connector 20 includes an isolator sleeve, indicated generally at 21, which is generally hollow and cylindrical in shape. The sleeve 21 is preferably formed of a rigid metal, such as steel, and preferably has a constant outer diameter before installation. An axial bore is thus defined through the sleeve 21. The axial bore is stepped so as to form an internal shoulder 22 which divides the sleeve 21 into an upper portion 23 and a lower portion 24. The upper portion 23 of the sleeve 21 has a relatively large internal diameter and a relatively thin wall thickness, while the lower portion 24 of the sleeve 21 has a relatively small internal diameter and a relatively thick wall thickness. A threaded aperture 25 is formed through the wall of the lower portion 24 of the sleeve 21. A set screw 26 is threaded into the threaded aperture 25. It is desirable that the set screw 26 initially be only partially threaded into the threaded aperture 25 so as to protrude radially inwardly from the inner surface of the lower portion 24 of the sleeve 21 by a second dimension D2, as shown in FIG. 2. The second dimension D2 is preferably smaller than the first dimension D1, for a reason which will be explained below.

A welch plug 27 is disposed within the axial bore of the upper portion 23 of the sleeve 21, in abutment with the shoulder 22. A cup-shaped isolator 28 is also disposed within the axial bore of the upper portion of the sleeve 21. The isolator 28 is preferably formed from a resilient elastomeric material, such as rubber. The isolator 28 has a closed end which abuts the welch plug 27 and a hollow cylindrical body which extends upwardly adjacent to the inner surface of the upper portion 23 of the sleeve 21. Preferably, the outer diameter of the isolator 28 is slightly smaller than the inner diameter of the upper portion 23 of the sleeve 21. This allows the isolator 28 to slide easily within the upper portion 23 of the sleeve 21 during assembly.

The assembly and connection of the dampening connector 20 to the shift lever members 12 and 13 will now be described. Initially, the welch plug 27 and the isolator 28 are installed within the upper portion 23 of the sleeve 21, as described above. Then, the lower end of the upper shift lever member 13 is inserted within the upper portion 23 of the sleeve 21, as shown in FIG. 3. As this occurs, the knurled surface 13*a* and the aperture 13*b* are received within the hollow cylindrical body of the isolator 28 until the tip of the lower end of the upper shift lever member 13 abuts the closed end of the isolator 28. The welch plug 27 is provided to contain the rubber isolator 28 within the upper portion of the sleeve 21, preventing it from extending into the lower portion 24 thereof when the lower end of the upper shift lever member 13 is installed. Preferably, the outer diameter of the lower end of the upper shift lever member 13 is slightly smaller than the inner diameter of the isolator 28. This allows the lower end of the upper shift lever member 13 to slide easily within the isolator 28 during assembly.

Once installed in this manner, a crimping operation is performed on the upper portion 23 of the sleeve 21, compressing the relatively thin wall thereof radially inwardly about the isolator 28 and lower end of the upper shift lever member 13 enclosed therein, as shown in FIG. 4. Such crimping compresses the rubber isolator 28 tightly between the upper portion 23 of the sleeve 21 and the lower end of the upper shift lever member 13. The rubber isolator 28 is compressed about the knurled surface 13*a* and the aperture 13*b*. As a result, additional frictional engagement is provided between the upper shift lever member 13 and the isolator 28 to prevent relative movement therebetween.

To complete the assembly of the dampening connector 20, the upper end of the lower shift lever member 12 is inserted within the lower portion 24 of the sleeve 21, as shown in FIG. 3. To accomplish this, the sleeve 21 is oriented such that the set screw 26 is aligned with the flat 12a formed on the upper end of the lower shift lever member 12. As discussed above, the set screw 26 is partially threaded into the threaded aperture 25 so as to extend radially inwardly from the inner surface of the lower portion 23 of the sleeve 21 by the second dimension D2. The second dimension D2 is smaller than the first dimension D1 defined by the radial distance from the center of the flat 12a to the projected circumference of the cylindrical upper end of the lower shift lever member 12. Thus, the partially threaded set screw 26 prevents the sleeve 21 from being inserted over the upper end of the lower shift lever member 12 unless the set screw 26 is aligned with the flat 12a. This is important when the upper end of the upper shift lever member 13 is angled, as described above, because a desire relative orientation can be maintained between the lower shift lever member 12 and the upper shift lever member 13. Thus, the structure of this invention provides a means for positively orienting the shift lever members 12 and 13 relative to one another.

The upper end of the lower shift lever member 12 is inserted within the lower portion 24 of the sleeve 21 until the recess 12b is aligned with the set screw 26. Then, the set screw 26 is further threaded within the threaded aperture 25 so as to extend into the recess 12b, as shown in FIG. 4. In this manner, the sleeve 21 is positively secured to the upper end of the lower shift lever member 12.

In operation, the rubber isolator 28 prevents the transmission of noise and vibration from the sleeve 21 to the upper shift lever 13 by preventing those two components from touching one another. The use of the single stepped axial bore and welch plug 27 reduces manufacturing costs associated with the use of individual blind counterbored holes for the upper and lower portions 23 and 24, respectively, of the sleeve 21. The use of the set screw 26 permits the dampening connector 20 and the upper shift lever member 13 to be easily installed and removed from the lower shift lever member 12, while maintaining a predetermined relative orientation therebetween.

For example, when a truck containing a manual transmission 11 is being manufactured, it has been found that the upper shift lever member 13 (which, as mentioned above, extends into the driver compartment of the vehicle) can interfere with the installation of other components contained within the driver compartment. Thus, it may be convenient to delay the installation of the upper shift lever member 13 until after such other components are installed within the driver compartment of the vehicle. To accomplish this easily, the dampening connector 20 is installed on the upper shift lever member 13 as described above, while the lower shift lever member 12 remains below the floor 16 of the driver compartment. When all of the other components of the driver compartment have been installed, the upper shift lever member 13 and the dampening connector 20 are inserted through the opening in the floor 16. Inasmuch as the cooperation of the set screw 26 with the flat 12b mandates a predetermined orientation between the shift lever members 12 and 13, the installation of the dampening connector 20 on the upper end of the lower shift lever member 12 can be accomplished quickly and easily, without a detailed visual inspection. The ability of the installer to further tighten the set screw 26 so as to extend into the recess 13b provides additional confirmation of proper assembly. Similarly, the dampening connector 20 can be subsequently removed from the upper end of the lower shift lever member 12 quickly and easily.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A shift lever assembly comprising:

a first shift lever member including an end having a flat formed thereon; and a second shift lever member including a hollow end portion having a protrusion extending therein, said end of said first shift lever member being insertable within said hollow end portion of said second shift lever member without relative rotation such that said protrusion of said second shift lever member is aligned with said flat formed on said first shift lever member, whereby said flat and said protrusion cooperate to maintain a predetermined relative orientation between said first and second shift lever members during and after assembly.

2. The shift lever assembly defined in claim 1 wherein said second shift lever member is provided with an end, and further including a connector having a first hollow portion and a second portion, said second shift lever member end being secured to said second portion of said connector, said end of said first shift lever member extending within said hollow portion of said connector.

3. The shift lever assembly defined in claim 1 wherein said protrusion is a threaded fastener disposed within a threaded opening formed through said hollow end portion of said second shift lever member such that a portion of said threaded fastener extends within said hollow end portion of said second shift lever member.

4. The shift lever assembly defined in claim 1 further including means for securing said second shift lever member to said first shift lever member.

5. The shift lever assembly defined in claim 4 wherein said protrusion is a threaded fastener disposed within a threaded opening formed through said hollow end portion of said second shift lever member such that a portion of said threaded fastener extends within said hollow end portion of said second shift lever member.

6. The shift lever assembly defined in claim 5 wherein said means for securing includes said threaded fastener which is rotated within said threaded opening so as to engage said flat formed on said first shift lever member.

7. The shift lever assembly defined in claim 6 further including a recess formed in said flat formed on said first shift lever member, said threaded fastener extending into said recess when rotated within said threaded opening so as to secure said second shift lever member to said first shift lever member.

8. The shift lever assembly defined in claim 2 wherein said second portion of said connector is hollow, and wherein said end of said second shift lever member extends within said hollow second portion of said connector.

9. The shift lever assembly defined in claim 8 further including vibration dampening material disposed within said end of said second shift lever member and said hollow second portion of said connector.

10. The shift lever assembly defined in claim 9 wherein said hollow second portion of said connector is crimped about said vibration dampening material and said end of said second shift lever member.

11. The shift lever assembly defined in claim 9 wherein said end of said second shift lever member has a knurled outer surface.

12. The shift lever assembly defined in claim 9 wherein said vibration dampening material is rubber.

13. A method of assembling a shift lever assembly for a vehicle transmission comprising the steps of: (a) providing a first shift lever member including an end having a flat formed thereon;

(b) providing a second shift lever member including a hollow end portion;

(c) providing a protrusion extending within the hollow end portion of the second shift lever member;

(d) orienting the end of the first shift lever member such that the flat is aligned with the protrusion of the hollow end portion of the second shift lever member; and (e) inserting the end of the first shift lever member within the hollow end portion of the second shift lever member, the flat and the protrusion cooperating to maintain a predetermined relative orientation between the first and second shift lever members during and after assembly.

14. The method of assembling a shift lever assembly defined in claim 13 wherein said step (b) includes the steps of providing the second shift lever member with an end, providing a connector having a first hollow portion and a second portion, securing the second shift lever member end to the second portion of the connector, and inserting the end of the first shift lever member within the first hollow portion of the connector.

15. The method of assembling a shift lever assembly defined in claim 13 wherein said step (c) is performed by providing a threaded fastener within a threaded opening formed through the hollow end portion of the second shift lever member such that a portion of the threaded fastener extends within the hollow end portion of the second shift lever member.

16. The method of assembling a shift lever assembly defined in claim 13 further including the step of securing the second shift lever member to the first shift lever member.

17. The method of assembling a shift lever assembly defined in claim 16 wherein said step (c) is performed by providing a threaded fastener within a threaded opening formed through the hollow end portion of the second shift lever member such that a portion of the threaded fastener extends within the hollow end portion of the second shift lever member.

18. The method of assembling a shift lever assembly defined in claim 17 wherein said step of securing the second shift lever member to the first shift lever member is performed by rotating the threaded fastener within the threaded opening so as to engage the flat formed on the first shift lever member.

19. The method of assembling a shift lever assembly defined in claim 18 further including the step of providing a recess in the flat formed on the first shift lever member, the threaded fastener extending into the recess when rotated within the threaded opening so as to secure said second shift lever member to said first shift lever member.

* * * * *